US010672049B1

(12) United States Patent
Biggs et al.

(10) Patent No.: US 10,672,049 B1
(45) Date of Patent: Jun. 2, 2020

(54) SAMPLE COLOR SELECTION FOR ONLINE RETAIL ITEMS

(71) Applicant: Amazon Technologies, Inc., Seattle, WA (US)

(72) Inventors: Jody David Biggs, Seattle, WA (US); Srijith Ravikumar, Seattle, WA (US); Brent Russell Smith, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 875 days.

(21) Appl. No.: 14/494,576

(22) Filed: Sep. 23, 2014

(51) Int. Cl.
*G06Q 30/06* (2012.01)

(52) U.S. Cl.
CPC .............................. *G06Q 30/0621* (2013.01)

(58) Field of Classification Search
None
See application file for complete search history.

(56) References Cited

U.S. PATENT DOCUMENTS

| 8,600,153 B2 * | 12/2013 | Gershon | G06F 17/3025 |
| | | | 382/162 |
| 2009/0281925 A1 * | 11/2009 | Winter | G06F 17/3025 |
| | | | 705/26.1 |
| 2013/0083999 A1 * | 4/2013 | Bhardwaj | G06Q 30/0643 |
| | | | 382/165 |
| 2015/0169992 A1 * | 6/2015 | Ioffe | G06K 9/6215 |
| | | | 382/218 |

* cited by examiner

*Primary Examiner* — Brittney N Miller
*Assistant Examiner* — Anna Mae Mitros
(74) *Attorney, Agent, or Firm* — Eversheds Sutherland (US) LLP

(57) ABSTRACT

Systems, methods, and computer-readable media are disclosed for identifying a set of images of child variants of a parent item, identifying a set of colors in the set of images, categorizing the set of colors into color subgroups, identifying a set of representative color(s) for the color subgroups, generating a color value distribution representation for an image of a child variant that indicates a respective number of pixels in the child variant image corresponding to each of one or more representative colors, identifying a color cluster in the color value distribution representation, scoring the color cluster, and selecting a particular color from the color cluster for inclusion in a sample image of the child variant if the color cluster score meets or exceeds a threshold value.

20 Claims, 6 Drawing Sheets

SAMPLE COLOR SELECTION FOR ONLINE RETAIL ITEMS

BACKGROUND

A number of different variations of a retail item may be made available for purchase. For example, a particular clothing apparel item sold by or on behalf of a company, such as a type of jacket, may be available for purchase in a variety of sizes, colors, and designs. When searching for or browsing such items online, various sample images may be presented showing the different colors or designs that are available for purchase. Selecting a color or a set of colors from an image of a particular variation of a retail item to represent the variation in a sample image may not be readily achievable, particularly if multiple colors are present in the image of the variation.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
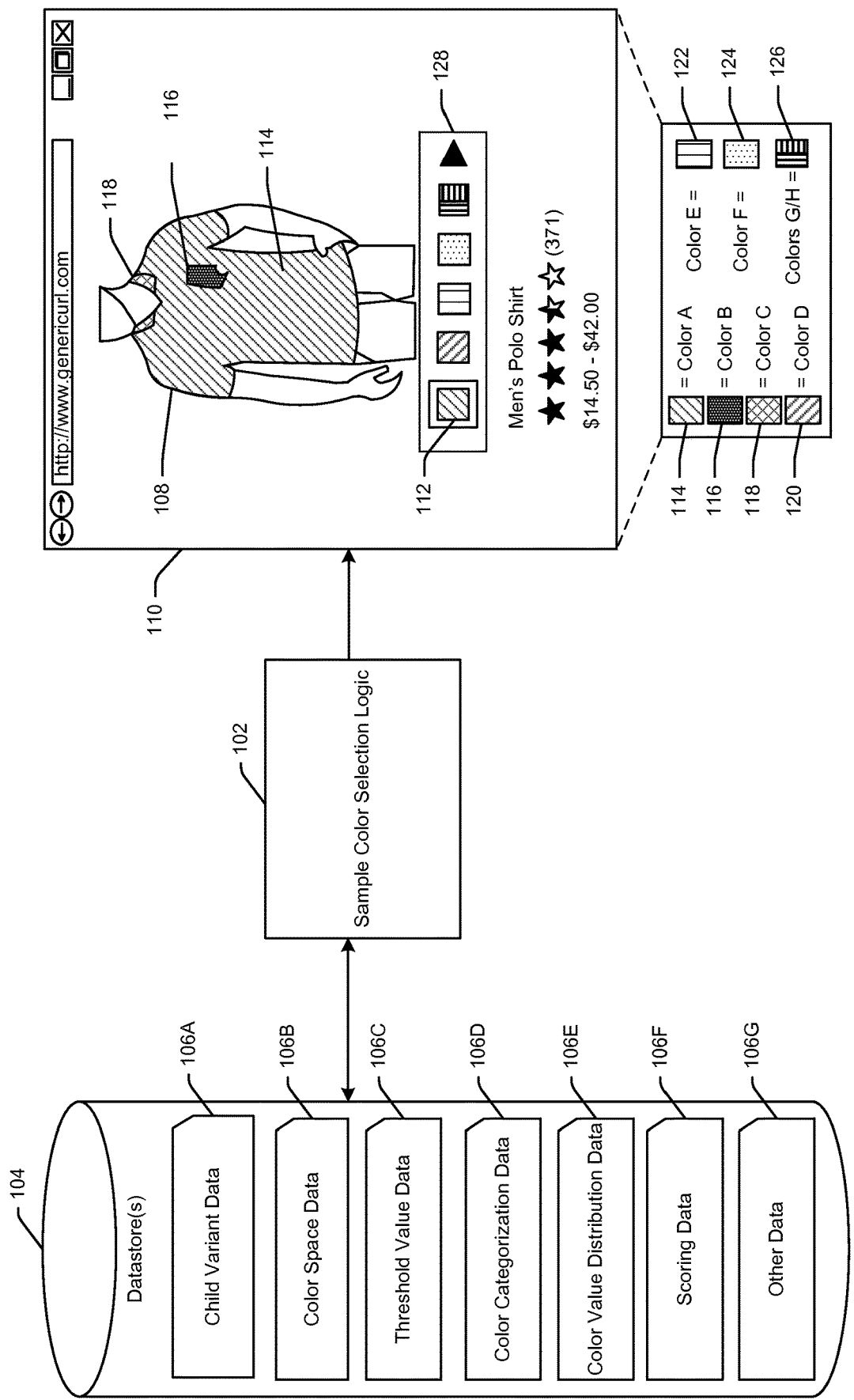
FIGS. 1A-1C are schematic diagrams of illustrative use cases in accordance with one or more example embodiments of the disclosure.

This disclosure relates to, among other things, systems, methods, computer-readable media, techniques, and methodologies for determining one or more dominant colors present in an image of a child variant of an item and storing one or more color value(s) representative of the dominant color(s) for use in generating a sample image corresponding to the child variant that includes the dominant color(s). While example embodiments of the disclosure may be described herein with respect to systems and processes for determining dominant color(s) of a child variant for inclusion in a sample image of the child variant, it should be appreciated that the disclosure is more broadly applicable to selecting any one or more attributes of a child variant of a retail item for inclusion in a sample image corresponding to the child variant. Such attributes may include, without limitation, shapes, designs, or the like.

In an example embodiment of the disclosure, a parent item may be identified. The parent item may be, for example, a clothing apparel item manufactured by or on behalf of a particular retail entity and/or associated with a brand of the retail entity. While example embodiments of the disclosure may be described herein with respect to clothing apparel, it should be appreciated that the parent item may be any suitable retail item having a variety of child variants that are available for purchase. For example, the retail item may include, without limitation, an appliance, a tool, an electronic device, or the like.

Any number of child variants of the parent item may be available for purchase. For example, a particular clothing apparel item (e.g., a shirt) may be available in a number of different colors. Each such color variation of the clothing apparel item may be considered a child variant. The clothing apparel item may also be available in a variety of sizes and/or design styles, each of which may also be considered a child variant. Further, in certain scenarios, multiple colors may be arranged in accordance with a particular pattern in a particular child variant. In addition, in certain scenarios, a certain portion of a child variant (e.g., a collar of a shirt, a logo, etc.) may be a first color, while another larger portion of the child variant (e.g., the sleeves and body of a shirt) may be a second color or set of colors arranged in accordance with a repeating pattern.

Each child variant of a parent item may be associated with a corresponding identifier, such as an Amazon Standard Identification Number (ASIN), that uniquely identifies the child variant. Each child variant identifier may be linked to an identifier (e.g., an ASIN) associated with the parent item. Child variant identifiers may be linked to a corresponding parent item via any suitable mechanism such as, for example, using structured data. For example, one or more database tables may be maintained that link each child variant identifier to the parent item identifier.

In an example embodiment of the disclosure, each child variant of a parent item may be depicted in a corresponding image. Algorithmic processing disclosed herein may be performed to identify one or more dominant colors present in each child variant image and store color values corresponding to the dominant color(s) for use in generating a sample image corresponding to the child variant. More specifically, a sample image containing the dominant color (s) may be generated and presented as a color swatch for the corresponding child variant.

In an example embodiment of the disclosure, once a set of child variants of a parent item have been identified, the set of all colors present in images of the child variants may be determined. For example, each image of a child variant may be analyzed to determine each color present in the image. In certain example scenarios, the color value of each pixel in the image may be determined. The color value may be represented as a coordinate value in any suitable color space such as, for example, a color-opponent space based on the International Commission on Illumination (CIE) XYZ space (e.g., the Hunter Lab color space, the CIELAB color space, etc.); a color space based on an additive color model such as the RGB color model (e.g., a standard RGB color space (sRGB), the Adobe RGB color space, etc.); a color space based on a subtractive color model such as the CMYK color model; or the like. A color model may refer to a mathematical model in which colors are represented as tuples of numbers (e.g., three tuples in the RGB color model, four tuples in the CMYK model, etc.). A mapping function may be used to map a given color model to a reference color space to establish, within the reference color space, a color gamut that defines an absolute color space for the color model. The reference color space may include, without limitation, the CIELAB or CIEXYZ color spaces. Further, each color value may be represented by any suitable bit depth, where the bit depth may be the number of bits used to represent the color of a pixel or the number of bits used to represent each color component of a pixel (e.g., the R-component of an RGB pixel). Example bit depths may include, without limitation, 1-bit color values (e.g., a monochrome image), 8-bit color values (e.g., a grayscale image), 16-bit color values (e.g., high-color images), 24-bit color values (e.g., true-color images), and so forth.

Once the set of all colors present in all child variant images is determined, the set of colors may be categorized into color subgroups, where each color subgroup includes colors that are visually similar. In an example embodiment of the disclosure, two colors may be determined to be visually similar if a distance or difference between respective tuples representing the two colors within a particular color space is within a corresponding threshold value. For example, in the CIELAB color space, each color within the color gamut may be represented by a tuple (L*, a*, b*) where L* represents the lightness or brightness of the color, a* represents the color's position between red/magenta and green, and b* represents the color's position between yellow and blue. Accordingly, the distance between two colors in the CIELAB color space represented by the tuples $(L^*_1, a^*_1, b^*_1)$ and $(L^*_2, a^*_2, b^*_2)$ may be given by Equation (1) below.

$$\Delta E^*_{ab} = \sqrt{((L^*_2 - L^*_1)^2 + (a^*_2 - a^*_1)^2 + (b^*_2 - b^*_1)^2)} \quad \text{Eq (1):}$$

Colors having a difference there between that is within a predetermined threshold may be determined to be visually similar and may be categorized into the same color subgroup. For example, if the CIELAB color space is being used, and it is determined that $\Delta E^*_{ab} < a$ threshold value (t) or that $\Delta E^*_{ab} \leq t$, the two colors represented by the tuples $(L^*_1, a^*_1, b^*_1)$ and $(L^*_2, a^*_2, b^*_2)$ may be determined to be imperceptibly different to a human eye, and thus, visually similar for the purposes of categorization into a color subgroup. In certain example scenarios, the threshold value (t) may be approximately equal to a "just noticeable difference" (JND) between colors in the CIELAB color space. In other example scenarios, the threshold value may be less than the JND distance, and thus, even less variation may be permissible between colors categorized in the same color subgroup. It should be appreciated that the threshold value (t) may be any suitable value for identifying colors that may be perceived as visually similar, and in certain example embodiments, may be determined empirically.

Once the set of colors have been categorized into color subgroups, a respective representative color may be chosen for each color subgroup. A particular representative color may be, for example, an average color value that is representative of all colors categorized within a corresponding color subgroup. For example, if each color within a particular color subgroup is represented by a corresponding tuple within the CIELAB color space (e.g., (L*, a*, b*)), the representative color may be obtained by averaging corresponding tuple values across all colors within the color subgroup to obtain an average color value for the subgroup (e.g., $\overline{L}^*, \overline{a}^*, \overline{b}^*$). It should be appreciated that the above example is merely illustrative and that the representative color may be chosen in any suitable way. For example, the representative color for a color subgroup may be the mode, median, or any other suitable metric that may serve as a representation of the color values within the color subgroup.

Once a respective representative color has been identified for each color subgroup, the set of colors present across all child variant images may be reduced to a smaller set of representative colors. For example, for each color in the set of child variant images, the color subgroup that contains that color may be identified, and the representative color corresponding to the color subgroup may be used in place of the color. In certain example embodiments, the smaller set of representative colors may be obtained by compressing the color space in which the set of colors present across all child variant images are represented to a smaller color space. This compression may be a bit-depth compression. For example, if an n-bit color depth is used to represent all possible colors that may be present in the set of child variant images, an (n−x) color depth may be used to represent all possible representative colors, where x is an integer greater than zero. In this manner, a set of colors categorized in a same color subgroup and represented by n-bit color values may be represented by a smaller set of (n−x)-bit representative color values. In certain example embodiments, all n-bit color values in a particular color subgroup may map to a single (n−x)-bit color value indicative of a representative color for that color subgroup.

A respective first color value distribution representation may then be generated for each child variant image. A color value distribution representation may indicate the distribution of color values present in a child variant image. The representation may be, for example, a color histogram that indicates a respective number of pixels in the image for each representative color having corresponding color values present in the image. In certain example embodiments, reduction of the set of colors present across all child variant images to the reduced set of representative colors may be performed as part of the process for generating the color value distribution representations. For example, those pixel(s) in a child variant image having color values categorized within a particular color subgroup may be identified, and the number of any such pixel(s) may be associated in the color histogram with a color value of the representative color for that particular color subgroup. This may be repeated for all pixels of the child variant image such that the color histogram for the image indicates a respective number of pixels in the image that correspond to each of one or more representative colors. A color value distribution representation may be similarly generated for each child variant image. Using the set of representative colors rather than the set of colors to generate the color histograms may reduce the impact of noise and color value variation introduced to the child variant images as a result of, for example, changes in illumination or light reflection/absorption characteristics.

Once each respective first color value distribution representation is generated, an aggregate representation of the distribution of color values across all child variant images may be determined. The aggregate color value distribution representation may be, for example, an average color histogram that indicates an average number of pixels across all child variant images that have color values corresponding to the color value of a particular representative color. If necessary, each respective first color value distribution representation and/or the aggregate color value distribution representation may be normalized to account for differences an image size (e.g., different numbers of pixels) among the set of child variant images.

A respective second color value distribution representation may then be generated for each child variant image using the respective first color value distribution representation and the aggregate color value distribution representation. For example, for each child variant image, the corresponding first color histogram may be subtracted from the average color histogram to generate a second color histogram for the image. Alternatively, the average color histogram may be subtracted from each first color histogram to generate the corresponding second color histograms. In this manner, color values of pixels corresponding to static elements in an image may be excluded from consideration in the second color value distribution representations (e.g., the second color histograms). Such static elements may include, without limitation, a background of an image, attributes of a model depicted in the image (e.g., a model's hair, face, or body), etc. In certain example scenarios, certain elements (e.g., skin complexion of a model, hair color, etc.) that are unrelated to a child variant itself may vary from one child variant image to the next. In such example scenarios, a filter may be used to filter out those color values that fall within a range of color values corresponding to, for example, a range of skin complexions or hair colors.

Once the second color value distribution representation is generated for a child variant image, processing to identify one or more dominant colors present in the child variant image may be performed. Such processing (which may be performed for each child variant image) may include first making a determination as to whether a color name has been specified for the child variant. In certain scenarios, a color name may be assigned to a child variant by a manufacturer or distributor of the parent item to which the child variant relates. For example, a child variant of a clothing apparel item may be pre-associated with the color name "midnight blue." Further, in certain example scenarios, multiple color names may be associated with a particular child variant. For example, a child variant of a clothing apparel item may include a striped pattern of two alternating colors, in which case, a color name associated with each color may be associated with the child variant.

If one or more color names have been associated with the child variant, a database look-up may be performed to identify a respective color value for each such color. The color value may be a tuple in any suitable color space (e.g., a tuple in the CIELAB color space, a tuple in an RGB color space, etc.). Upon identifying a respective color value for each color name associated with the child variant, the second color value distribution representation for the child variant image may be analyzed to identify one or more color clusters. If no color name has been associated with the child variant, the database look-up step described above may be bypassed, and the processing may proceed to identifying color cluster(s).

A color cluster may refer to a group of one or more colors that are represented in the second color value distribution and which are separated by a distance that does not exceed a threshold value. In certain example scenarios, the threshold value may be a JND distance between colors in the CIELAB color space. If the second color value distribution is a color histogram, the threshold value may correspond to a width of a color cluster. As previously noted, the threshold (e.g., the JND value) used to identify a color cluster may be larger than the threshold used to assign colors to color subgroups. As such, a color cluster may include representative colors from more than one color subgroup.

Once a color cluster has been identified, a metric representative of a strength of the color cluster may be determined. The metric may be, for example, a number of pixels in the second color histogram corresponding to representative colors within the color cluster. A score for the color cluster may then be calculated using the strength metric. In those example embodiments in which a color name has been associated with the child variant, the score of the color cluster may be calculated by dividing the strength metric by a distance of the color cluster from the color value associated with the color name. In certain example embodiments, the color value of a particular representative color in the color cluster may be chosen for determining the distance of the color cluster from the color value associated with the color name. In other example embodiments, an average color value for each color within a color cluster may be chosen for calculating the distance. If multiple color names have been associated with a child variant (e.g., a clothing apparel item having a striped pattern of alternating colors), a score for the color cluster may be calculated with respect to each color name. It should be appreciated that the above examples are merely illustrative and that any suitable color value from the color cluster may be chosen for calculating the distance. Further, in those example embodiments in which no color name is pre-associated with the child variant, all color distances may be normalized to 1, in which case, the strength metric itself may represent the score of a color cluster.

The score calculated for each identified color cluster may be compared against a threshold value to determine whether to select a color from the color cluster as a dominant color for use in a sample image of the child variant. If the score calculated for a color cluster meets or exceeds the threshold value, a particular representative color from the color cluster may be identified as a dominant color. The threshold value may be chosen so as to ensure that a color cluster that satisfies the threshold value is perceptibly more dominant in the child variant image than a color cluster that does not satisfy the threshold. In certain example embodiments, multiple color clusters may satisfy the threshold value, in which case, multiple dominant colors may be selected for use in the sample color image. In those example embodiments in which no color cluster satisfies the threshold value, a color in the color cluster having the highest score may be selected as the dominant color.

Each color in a color cluster may be indistinguishable from each other color in the color cluster, and thus, any color in a color cluster having a score that satisfies the threshold may be chosen as the dominant color. For example, the color having the largest peak in the color histogram may be chosen. Alternatively, the color values of each color in the color cluster may be averaged, and the average color value may be chosen as the dominant color. In still other example embodiments, a color may be chosen at random as the dominant color from a color cluster having a score that satisfies the threshold value.

In certain example embodiments in which multiple colors have been identified as dominant within a child variant, a first dominant color may be chosen for use in a first subset of sample images of the child variant and a second dominant color may be chosen for use in a second subset of sample images of the child variant. Customer data including, without limitation, purchase data, search/browsing history data, and so forth may be collected and analyzed to determine whether the first dominant color is more likely to generate interest in the child variant than the second dominant color, or vice versa. In addition, in certain example embodiments, a particular dominant color may be selected for use in a sample image from among multiple dominant colors within a child variant based on user-specific purchase data, search/browsing history data, or the like. For example, if a particular user has demonstrated an affinity towards a particular dominant color, that color may be selected for use in a sample image of the child variant presented to that particular user to the exclusion of other dominant colors.

Example embodiments of the disclosure provide a number of technical features or technical effects. For example, in accordance with example embodiments of the disclosure, a greater breadth and granularity of colors may be displayed in sample images of child variants of a parent item. In addition, in accordance with certain example embodiments of the disclosure, a sample image that more accurately represents a child variant image having multiple dominant colors may be presented for the child variant. For example, for a clothing apparel item that includes a striped pattern of multiple colors, a sample image that displays the striped pattern may be generated. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Case

FIG. 1A is a schematic diagram of an illustrative use case in accordance with one or more example embodiments of the disclosure. As shown in FIG. 1A, sample color selection logic 102 may receive input data from one or more datastores 104 and may execute processing on the input data to generate output data which may also be stored in the datastore(s) 104. The input data stored in the datastore(s) 104 may include, without limitation, child variant data 106A that may include images of child variants of one or more parent items, mappings of character strings that are indicative of color names to corresponding child variants, and mappings of the character strings to corresponding color values of the color names; color space data 106B that may indicate color values associated with colors forming part of one or more color gamuts corresponding to one or more color spaces; and threshold value data 106C that may indicate one or more thresholds for use by the sample color selection logic 102 in making one or more comparisons. The threshold value data 106C may include, without limitation, a first threshold value against which a color distance between two colors may be compared to determine whether the colors should be associated with a same color subgroup, a second threshold value against which color distances between colors represented in a color value distribution representation may be compared to determine whether the colors form part of a same color cluster, and a third threshold value against which a color cluster score may be compared to determine whether the color cluster includes a dominant color present in a corresponding child variant. It should be appreciated that any of the first, second, and/or third threshold values may be the same value. It should further be appreciated that any number of additional threshold values may be included in the threshold value data 106C and used by the sample color selection logic 102 to make one or more comparisons. For example, a first color subgroup may include colors that are within a first threshold color distance of each other, while a second color subgroup may include colors that are within a second different threshold color distance of each other. Similarly, a score calculated for a first color cluster may be compared against a first threshold score and a score for a second color cluster may be compared against a second different threshold score for determining whether the first and/or the second color clusters include dominant colors for inclusion in a sample image.

The output data stored in the datastore(s) 104 may include, without limitation, color categorization data 106D that may indicate the color subgroup to which each color present in a child variant image has been assigned and the color values of representative colors of the various color subgroups; color value distribution data 106E that may include, for example, first and second color value distribution representations for each child variant image as well as an average color value distribution representation for the set of child variant images; and scoring data 106F that may include scores calculated for various color clusters that have been identified. The datastore(s) 104 may further store other data 106G such as, for example, customer data (e.g., purchase data, search/browsing data, etc.), data indicating the performance of a first set of sample images including a first dominant color of a child variant as compared to a second set of sample images including a second dominant color of the child variant (where performance may be measured based on purchase data, search/browsing data, or the like for the child variant), and so forth.

The sample color selection logic 102 may execute processing in accordance with example embodiments disclosed herein to determine one or more dominant colors for use in a sample image of a child variant of a parent item. Color values corresponding to the dominant color(s) may be stored as part of the child variant data 106A for the child variant, and a sample image may be generated using the stored color values and displayed in connection with an image of the child variant. For example, an image 108 of a particular child variant of a clothing apparel item may be displayed on a web page 110. The child variant image 108 may include multiple colors 114, 116, 118 present on the child variant item. The image 108 may further include additional colors not present on the child variant item such as, for example, a background color, various colors present on a model wearing the clothing apparel item, and so forth. The sample color selection logic 102 may identify a particular color 114 as a dominant color, and a sample image 112 of the dominant color 114 may be presented in association with the child variant image. The sample image 112 may be presented in any suitable manner such as, for example, as part of a scrollable carousel 128 that may include sample images corresponding to other child variants of the parent item. The sample images corresponding to other child variants may include additional dominant colors present in the other child variants (e.g., colors 120, 122, 124, 126). Presentation of the sample images in a scrollable carousel 128 or the like may allow for a user to browse the various sample images and select a particular sample image to initiate display of an image of the corresponding child variant.

Figure 1B:
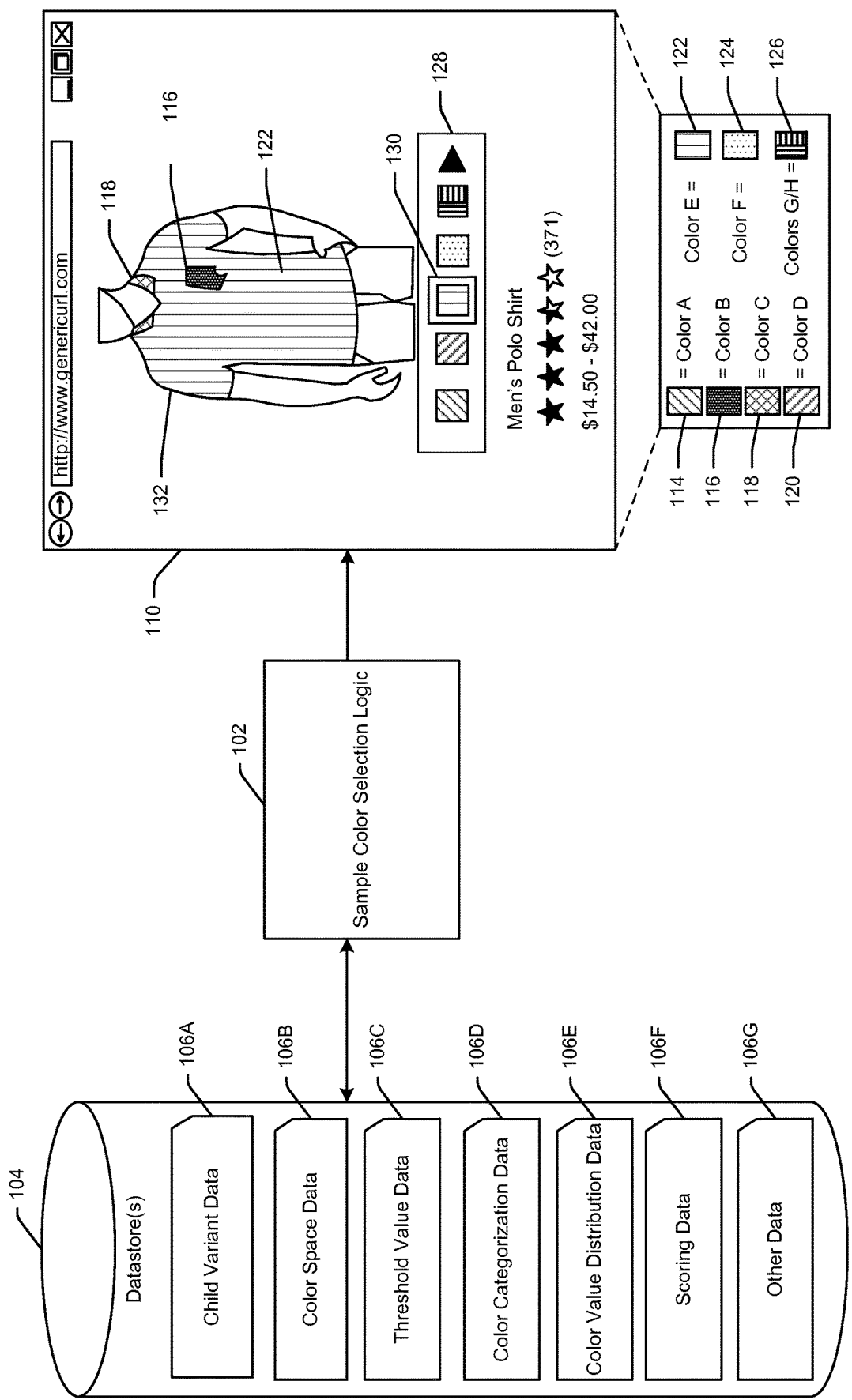

FIG. 1B is a schematic diagram of another illustrative use case in accordance with one or more example embodiments of the disclosure. As depicted in FIG. 1B, an alternate sample image 130 may be selected from among the sample images presented in the scrollable carousel 128. Selection of the sample image 130 may cause an image 132 of the corresponding child variant to be displayed. The sample color selection logic 102 may have executed processing to identify the color 122 as a dominant color, and a color value corresponding to the dominant color 122 may have been stored as part of the child variant data 106A for use in generating the sample image 130. Similar to the child variant image 108, the child variant image 132 may additionally include other colors 116, 118 of the child variant that are determined not to be dominant, and may further include additional colors not present on the child variant item such as, for example, a background color, various colors present on a model wearing the clothing apparel item, and so forth.

Figure 1C:
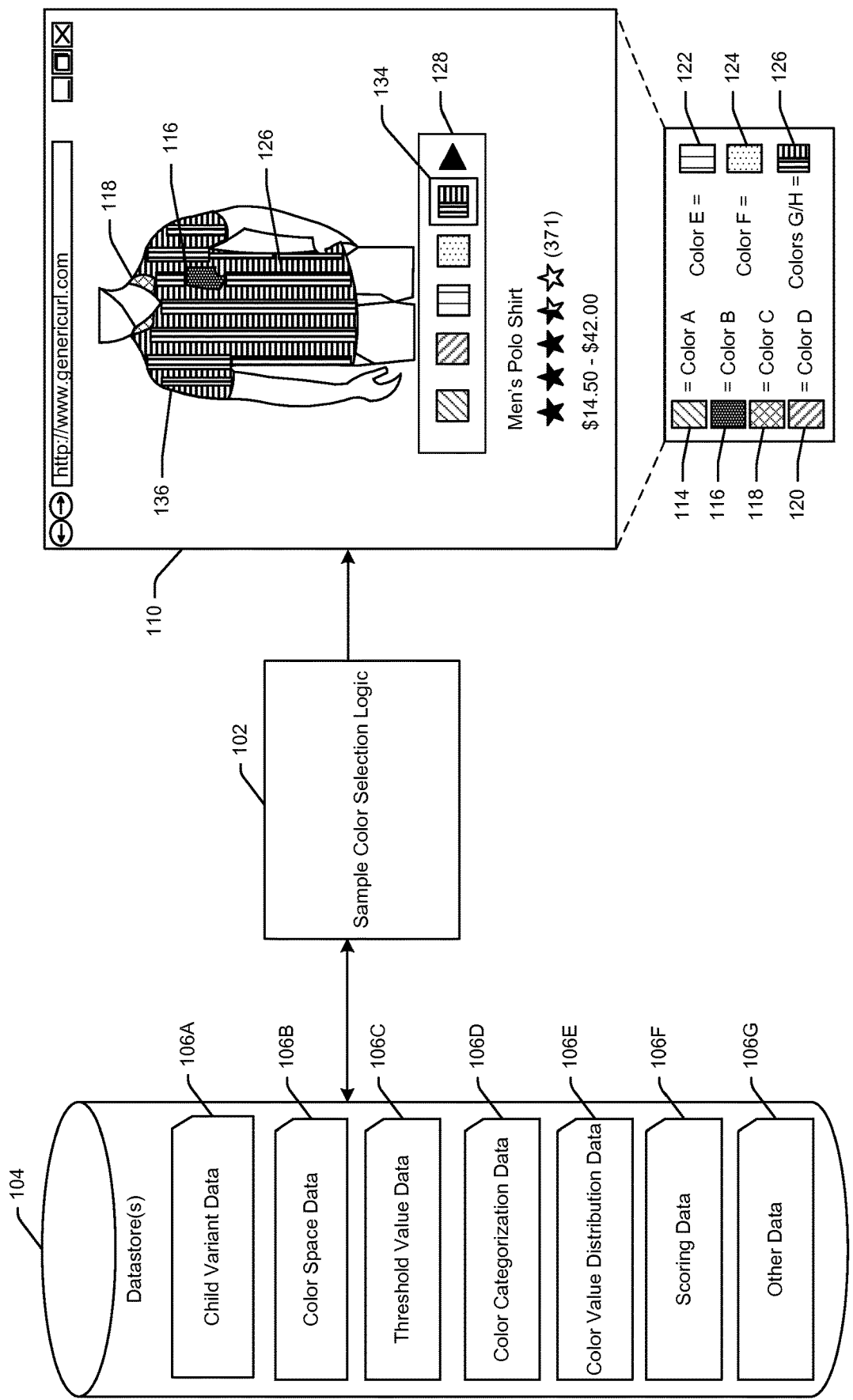

FIG. 1C is a schematic diagram of yet another illustrative use case in accordance with one or more example embodiments of the disclosure. As depicted in FIG. 1C, an alternate sample image 134 may be selected from among the sample images presented in the scrollable carousel 128. Selection of the sample image 134 may cause an image 136 of the corresponding child variant to be displayed. The sample color selection logic 102 may have executed processing to identify the multiple colors 126 as dominant colors, and color values corresponding to the dominant colors 126 may have been stored as part of the child variant data 106A for use in generating the sample image 134. Because multiple colors are identified as being dominant colors for the child variant shown in FIG. 1C, the sample image 134 may include each of the multiple dominant colors 126. In certain example embodiments, the sample image 134 may depict the multiple dominant colors 126 in a same pattern as the colors appear in the image 136 of the child variant. Further, similar to the child variant images 108 and 132, the child variant image 136 may additionally include other colors 116, 118 of the child variant that are determined not to be dominant, and may further include additional colors not present on the child variant item such as, for example, a background color, various colors present on a model wearing the clothing apparel item, and so forth.

Illustrative Architecture

Figure 2:
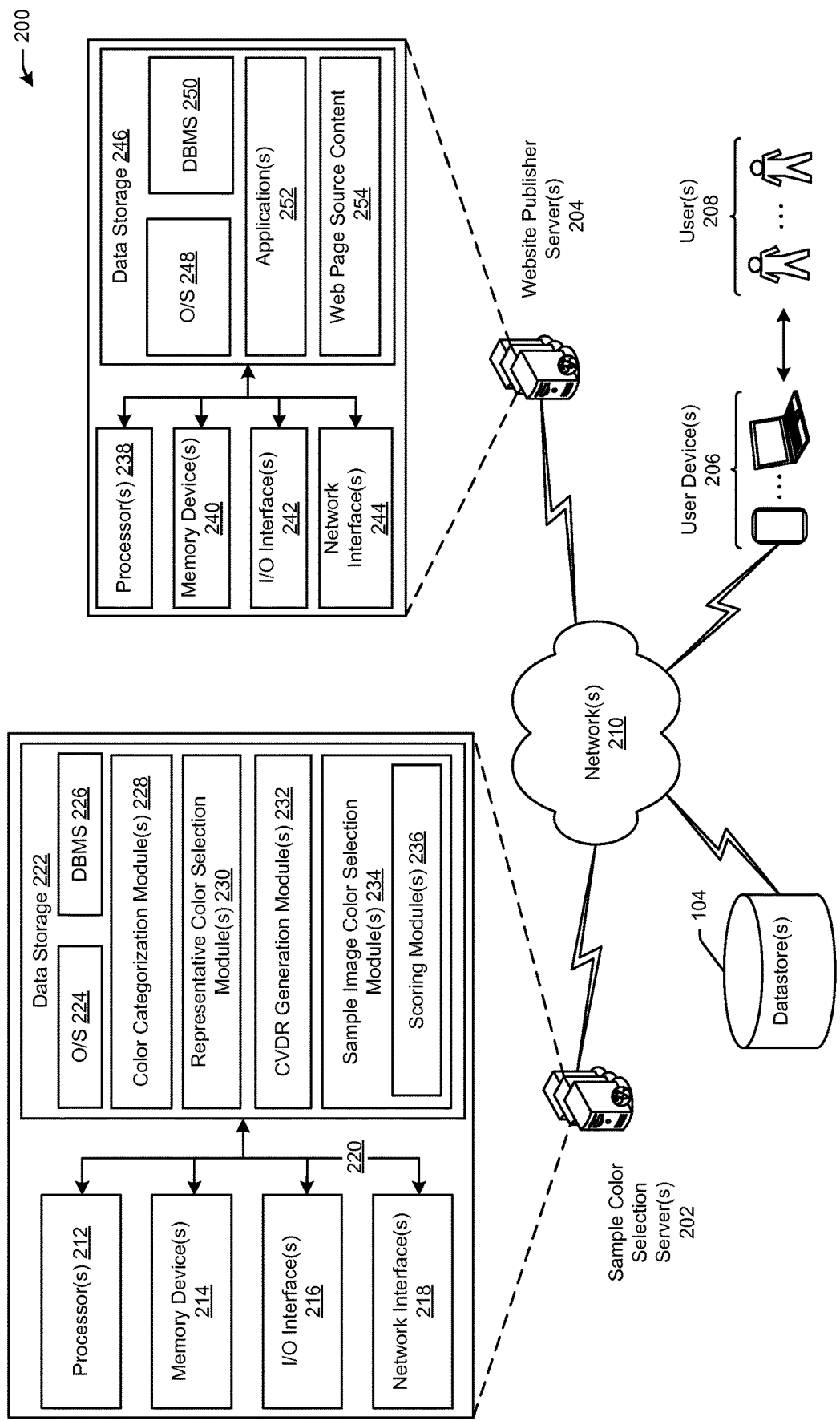
FIG. 2 is a schematic block diagram of an illustrative networked architecture in accordance with one or more example embodiments of the disclosure.

FIG. 2 is a schematic block diagram of an illustrative networked architecture 200 in accordance with one or more example embodiments of the disclosure. The networked architecture 200 may include one or more sample color selection servers 202, one or more website publisher servers 204, and one or more user devices 206 operable by one or more users 208. While the sample color selection server(s) 202, the website publisher server(s) 204, and/or the user device(s) 206 may be referred to herein in the singular, it should be appreciated that multiple ones of any of the illustrative components of the networked architecture 200 may be provided, and any processing described as being performed by a particular component of the architecture 200 may be performed in a distributed manner by multiple such components.

The sample color selection server 202, the website publisher server 204, and/or the user device 206 may be configured to communicate via one or more networks 210. The network(s) 210 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 210 may have any suitable communication range associated therewith and may include, for example, global networks (e.g., the Internet), metropolitan area networks (MANs), wide area networks (WANs), local area networks (LANs), or personal area networks (PANs). In addition, the network(s) 210 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the color selection server 202 may include one or more processors (processor(s)) 212, one or more memory devices 214 (generically referred to herein as memory 214), one or more input/output ("I/O") interface(s) 216, one or more network interfaces 218, and data storage 220. The sample color selection server 202 may further include one or more buses 220 that functionally couple various components of the server 202. These various components of the server 202 will be described in more detail hereinafter.

The bus(es) 220 may include at least one of a system bus, a memory bus, an address bus, or a message bus, and may permit exchange of information (e.g., data (including computer-executable code), signaling, etc.) between various components of the server 202. The bus(es) 220 may include, without limitation, a memory bus or a memory controller, a peripheral bus, an accelerated graphics port, and so forth. The bus(es) 220 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 214 of the server 202 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 214 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 214 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 222 may include removable storage and/or non-removable storage including, but not limited to, magnetic storage, optical disk storage, and/or tape storage. The data storage 222 may provide non-volatile storage of computer-executable instructions and other data. The memory 214 and the data storage 222, removable and/or non-removable, are examples of computer-readable storage media (CRSM) as that term is used herein.

The data storage 222 may store computer-executable code, instructions, or the like that may be loadable into the memory 214 and executable by the processor(s) 212 to cause the processor(s) 212 to perform or initiate various operations. The data storage 222 may additionally store data that may be copied to memory 214 for use by the processor(s) 212 during the execution of the computer-executable instructions. Moreover, output data generated as a result of execution of the computer-executable instructions by the processor(s) 212 may be stored initially in memory 214, and may ultimately be copied to data storage 220 for non-volatile storage.

More specifically, the data storage 222 may store one or more operating systems (O/S) 224; one or more database management systems (DBMS) 226; and one or more program modules, applications, or the like such as, for example, one or more color categorization modules 228, one or more representative color selection modules 230, one or more color value distribution representation (CVDR) generation modules 232, and one or more sample image color selection modules 234. Any of the program modules may include one or more sub-modules. For example, the sample image color selection module(s) 234 may include one or more scoring module(s) 236. In addition, the data storage 222 may store various other types of data such as, for example, any of the data depicted as being stored in the datastore(s) 104. Any of the modules depicted in FIG. 2 may include computer-executable code, instructions, or the like that may be loaded into the memory 214 for execution by one or more of the processor(s) 212. Further, any data stored in the data storage 222 may be loaded into the memory 214 for use by the processor(s) 212 in executing computer-executable code. In addition, any data stored in the datastore(s) 104 may be accessed via the DBMS 226 and loaded in the memory 214 for use by the processor(s) 212 in executing computer-executable code.

The processor(s) 212 may be configured to access the memory 214 and execute computer-executable instructions loaded therein. For example, the processor(s) 212 may be configured to execute computer-executable instructions of the various program modules of the server 202 to cause or facilitate various operations to be performed in accordance with one or more embodiments of the disclosure. The processor(s) 212 may include any suitable processing unit capable of accepting data as input, processing the input data in accordance with stored computer-executable instructions, and generating output data. The processor(s) 212 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 212 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 212 may be capable of supporting any of a variety of instruction sets.

Referring now to functionality supported by the various program modules depicted in FIG. 2, the color categorization module(s) 228 may include computer-executable instructions, code, or the like that responsive to execution by one or more of the processor(s) 212 may cause operations to be performed for identifying the set of all colors present in a set of child variant images and categorizing the set of colors into color subgroups. Colors that are separated by color distances in a suitable color space (e.g., the CIELAB color space, an RGB color space, etc.) that are within a threshold color distance may be categorized into a same color subgroup. The threshold color distance may be the same for different color subgroups or may be different for two or more color subgroups. In certain example embodiments, the threshold color distance may be a JND color distance or may be a lesser color distance. As each new color is identified from the set of child variant images, an associated color value for the new color may be compared against color values of colors that have already been categorized to determine whether the new color value is within a threshold color distance of color values for colors in existing color subgroups or whether a new color subgroup should be created for the new color value.

The representative color selection module(s) 230 may include computer-executable instructions, code, or the like that responsive to execution by one or more of the processor(s) 212 may cause processing to be performed to identify a respective representative color for each color subgroup. A particular representative color may be, for example, an average color value that is representative of all colors categorized within a corresponding color subgroup. However, any suitable metric may serve as a representative color value for a color subgroup such as, for example, a mode, median, or the like of color values within the color subgroup. In certain example embodiments, the representative color selection module(s) 230 may include computer-executable instructions, code, or the like that responsive to execution by one or more of the processor(s) 212 may cause a bit-depth compression to be performed to reduce the set of colors present across all child variant images to a reduced set of representative colors. More specifically, bit-depth compression of the color space may cause all colors that are categorized in a same color subgroup and represented by n-bit color values to be reduced to one or more representative colors represented by (n–x)-bit color values.

The CVDR generation module(s) 232 may include computer-executable instructions, code, or the like that responsive to execution by one or more of the processor(s) 212 may cause processing to be performed to generate, for each child variant image, a respective corresponding first color value distribution representation. The first color value distribution representation may be a color histogram that indicates a distribution of color values present in the child variant image. For example, the color histogram may indicate, for each of one or more representative colors, a respective number of pixels in the image having color values categorized within a color subgroup represented by the representative color. In certain example embodiments, a reduction of the set of colors in all child variant images to a smaller set of representative colors may occur as part of the processing performed to generate the first color value distribution representations. For example, each group of pixels having color values that fall within a same color subgroup may be represented in a first color histogram as a single peak corresponding to the color value of the representative color for that same color subgroup (or the color value(s) of multiple representative colors for that same color subgroup).

In other example embodiments, the reduction of the set of colors to the reduced set of representative colors may occur responsive to execution of computer-executable instructions of any of the other program modules such as, for example, the representative color selection module(s) 230, as described above.

The CVDR generation module(s) 232 may further include computer-executable instructions, code, or the like that responsive to execution by one or more of the processor(s) 212 may cause processing to be performed to generate an aggregate representation of the distribution of color values across all child variant images. The aggregate color value distribution representation may be, for example, an average color histogram that indicates an average number of pixels across all child variant images that have color values categorized in a same color subgroup corresponding to a particular representative color. The average color histogram may indicate an average number of pixel across all child variant images for each representative color of each color subgroup having constituent color values that are present in the set of child variant images.

The CVDR generation module(s) 232 may additionally include computer-executable instructions, code, or the like that responsive to execution by one or more of the processor(s) 212 may cause processing to be performed to generate a respective second color value distribution representation for each child variant image using the respective first color value distribution representation and the aggregate color value distribution representation. For example, for each child variant image, the corresponding first color histogram may be subtracted from the average color histogram to generate a second color histogram for the image. Alternatively, the average color histogram may be subtracted from each first color histogram to generate the corresponding second color histogram. In this manner, color values of pixels corresponding to static elements in an image may be excluded from consideration in the second color value distribution representations (e.g., the second color histograms).

The sample image color selection module(s) 234 may include computer-executable instructions, code, or the like that responsive to execution by one or more of the processor(s) 212 may cause processing to be performed to identify one or more dominant colors for use in a sample image of the child variant. Such processing may include identifying one or more color clusters present in a color value distribution representation corresponding to the child variant image (e.g., the second color histogram described earlier), scoring the color cluster(s), and determining which, if any, of the color cluster(s) have score(s) that satisfy a threshold value for selection of one or more dominant colors for inclusion in a sample image of the child variant. The sample image color selection module(s) 234 may include one or more scoring sub-module(s) 236 which may, in turn, include computer-executable instructions, code, or the like that responsive to execution by one or more of the processor(s) 212 may cause processing to be performed to generate a respective score for each identified color cluster. Processing supported by each of the program module(s) depicted in FIG. 2 will be described in more detail later in this disclosure with reference to the illustrative methods depicted in FIGS. 3 and 4.

Referring now to other illustrative components depicted as being stored in the data storage 222, the O/S 224 may be loaded from the data storage 222 into the memory 214 and may provide an interface between other application software executing on the server 202 and hardware resources of the server 202. More specifically, the O/S 224 may include a set of computer-executable instructions for managing hardware resources of the server 202 and for providing common services to other application programs (e.g., managing memory allocation among various application programs). The O/S 224 may include any operating system now known or which may be developed in the future including, but not limited to, any server operating system, any mainframe operating system, or any other proprietary or non-proprietary operating system.

The DBMS 226 may be loaded into the memory 214 and may support functionality for accessing, retrieving, storing, and/or manipulating data stored in the memory 214 and/or data stored in the data storage 222. The DBMS 226 may use any of a variety of database models (e.g., relational model, object model, etc.) and may support any of a variety of query languages. The DBMS 226 may access data represented in one or more data schemas and stored in any suitable data repository such as any of the datastore(s) 104. The datastores(s) 104 may include, without limitation, databases (e.g., relational, object-oriented, etc.), file systems, flat files, distributed datastores in which data is stored on more than one node of a computer network, peer-to-peer network datastores, or the like.

Referring now to other illustrative components of the server 202, one or more input/output (I/O) interfaces 216 may be provided that may facilitate the receipt of input information by the server 202 from one or more I/O devices as well as the output of information from the server 202 to the one or more I/O devices. The I/O devices may include, for example, one or more user interface devices that facilitate interaction between a user and the server 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The server 202 may further include one or more network interfaces 218 via which the server 202 may communicate with any of a variety of other systems, platforms, networks, devices, and so forth. Such communication may occur via any of one or more of the network(s) 210.

Referring now to other illustrative components of the networked architecture 200, in an illustrative configuration, the website publisher server 204 may include one or more processors (processor(s)) 238, one or more memory devices 240 (generically referred to herein as memory 240), one or more input/output ("I/O") interface(s) 242, one or more network interfaces 244, and data storage 246. The website publisher server 204 may further include one or more buses that functionally couple various components of the server 204. The bus(es) of the website publisher server 204 may include any of the example buses and bus architectures described with reference to the server 202. Similarly, the processor(s) 238 may include any of the example types of processors described with reference to the processor(s) 212, the memory 240 may include any of the example types of memory described with reference to the memory 214, the I/O interface(s) 242 may include any of the example types of I/O interfaces described with reference to the I/O interface(s) 216, and the network interface(s) 244 may include any of the example types of network interface(s) described with reference to the network interface(s) 218.

The data storage 246 may include any of the example types of data storage described with reference to the data storage 220. The data storage 246 may store computer-executable code, instructions, or the like that may be loadable into the memory 240 and executable by the processor(s) 238 to cause the processor(s) 238 to perform or initiate various operations. The data storage 246 may additionally store data that may be copied to memory 240 for use by the processor(s) 238 during the execution of the computer-executable instructions. Moreover, output data generated as a result of execution of the computer-executable instructions by the processor(s) 238 may be stored initially in memory 240, and may ultimately be copied to data storage 246 for non-volatile storage.

More specifically, the data storage 246 may store one or more operating systems (O/S) 248; one or more database management systems (DBMS) 250; one or more program modules, applications, or the like 252; and any of a variety of types of data such as, for example, web page content 254. The O/S 248 may include any of the example types of operating systems and may support any of the example functionality described with reference to the O/S 222. Similarly, the DBMS 250 may include any of the example types of database management systems and may support any of the example functionality described with reference to the DBMS 224. Any of the application(s) 252 may include computer-executable code, instructions, or the like that may be loaded into the memory 240 for execution by one or more of the processor(s) 238. Further, data stored in the data storage 246 may be loaded into the memory 240 for use by the processor(s) 238 in executing computer-executable code. In addition, any data stored in the datastore(s) 104 may be accessed via the DBMS 250 and loaded in the memory 240 for use by the processor(s) 238 in executing computer-executable code.

In an example embodiment of the disclosure, the website publisher server 204 may transmit the web page content 254 to a user device 206 responsive to receipt of a request for the content 254 from a browser application executing on the user device 206. The web page content 254 may include, for example, one or more sample images corresponding to child variants of a parent item. The sample images may include one or more colors identified as being dominant colors of the child variants. The sample image of a child variant may be generated using color value(s) indicative of the identified dominant color(s) for that child variant. In certain example embodiments, the processing to identify the dominant color(s) of a child variant may occur offline, and the website publisher server 204 may modify the web page source content 254 to include computer-executable instructions, code, scripts, or the like for causing the sample image of the child variant to be generated using the color value(s) of the dominant color(s) responsive to a request for the web page content 254. In other example embodiments, the processing to identify dominant color(s) of a child variant may occur in response to a network call from the website publisher server 204 to the sample color selection server 202 that may be initiated in response to, for example, a hypertext transfer protocol (HTTP) request received from a user device 206.

The user device 206 may include any of the illustrative hardware, software, or firmware components described with respect to the sample color selection server 202 and/or the website publisher server 204. The user device(s) 206 may include any suitable computing device including, but not limited to, a mobile device such as a smartphone, tablet, e-reader, wearable device, or the like; a desktop computer; a laptop computer; a content streaming device; a set-top box; or the like.

It should be appreciated that the program modules, applications, computer-executable instructions, code, or the like depicted in FIG. 2 as being stored in the data storage 222 and/or the data storage 246 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 202 and/or the server 204, and/or hosted on other computing device(s) accessible via one or more of the network(s) 210, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the server 202 and/or the server 204 may include alternate and/or additional hardware, software, or firmware components beyond those described or depicted without departing from the scope of the disclosure. More particularly, it should be appreciated that software, firmware, or hardware components depicted as forming part of the server 202 and/or the server 204 are merely illustrative and that some components may not be present or additional components may be provided in various embodiments. While various illustrative program modules have been depicted and described as software modules stored in data storage 222 and/or the data storage 246, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 3:
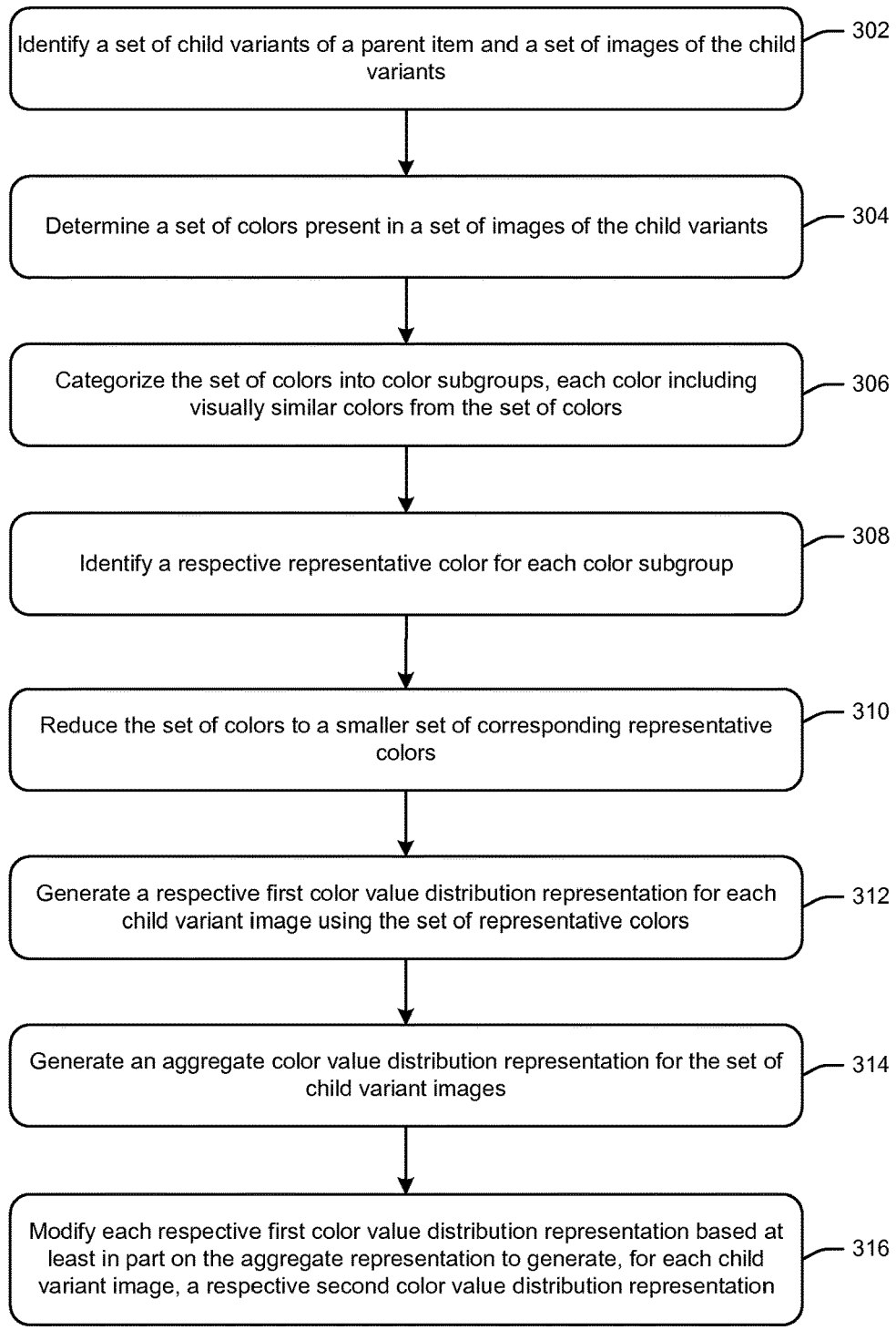
FIG. 3 is a process flow diagram of an illustrative method for generating color value distribution representations for a set of images of child variants of an item in accordance with one or more example embodiments of the disclosure.

FIG. 3 is a process flow diagram of an illustrative method 300 for generating color value distribution representations for a set of images of child variants of an item in accordance with one or more example embodiments of the disclosure.

At block 302, a set of child variants of a parent item may be identified. Each child variant may be associated with a corresponding identifier that may be linked to an identifier associated with the corresponding parent item. Further, at block 302, a set of images of the child variants may be identified from the child variant data 106A.

At block 304, computer-executable instructions of the color categorization module(s) 228 may be executed to determine a set of colors present in the set of child variant images. For example, computer-executable instructions of the color categorization module(s) 228 may be executed to analyze each image of a child variant to determine each color present in the image. More specifically, in certain example embodiments, the color value of each pixel in each child variant image may be determined. The color value may be represented as a coordinate value in any suitable color space including any of the example color spaces described earlier. Further, the color value may be represented using any suitable bit-depth.

At block 306, computer-executable instructions of the color categorization module(s) 228 may be executed to categorize the set of colors identified at block 304 into color subgroups, where each color subgroup includes colors that are visually similar. In an example embodiment of the disclosure, two colors may be determined to be visually similar if a color distance or color difference between respective tuples representing the two colors within a particular color space is within a corresponding threshold value (e.g., a threshold color distance). In certain example embodiments, the threshold color distance may be a JND distance between colors in the CIELAB color space. In other example embodiments, the threshold color distance may be less than a JND distance, and thus, even less variation than a JND may be permissible between colors categorized in the same color subgroup.

At block 308, computer-executable instructions of the representative color selection module(s) 230 may be executed to select a respective representative color for each color subgroup. A particular representative color may be, for example, an average color value that is representative of all colors categorized within a corresponding color subgroup. It should be appreciated that the above example is merely illustrative and that the representative color may be chosen in any suitable way. For example, the representative color for a color subgroup may be the mode, median, or any other suitable metric that may serve as a representation of the color values within the color subgroup.

At block 310, computer-executable instructions of the representative color selection module(s) 230 may be executed to reduce the set of colors to a smaller set of corresponding representative colors. For example, computer-executable instructions of the representative color selection module(s) 230 may be executed to cause a bit-depth compression to be performed to reduce the set of colors present across all child variant images to a reduced set of representative colors. More specifically, bit-depth compression of the color space may cause all colors that are categorized in a same color subgroup and represented by n-bit color values to be reduced to one or more representative colors represented by (n–x)-bit color values. In certain example embodiments, the operation at block 308 may not be a distinct operation from the operation at block 310. Rather, in certain example embodiments, representative colors may be identified as a result of the bit-depth compression of the set of colors across all child variant images.

At block 312, computer-executable instructions of the CVDR generation module(s) 232 may be executed to generate a respective first color value distribution representation for each child variant image. The first color value distribution representation may indicate the distribution of color values present in a child variant image and may be, for example, a color histogram that indicates the number of pixels in the image that have color values that correspond to the color value of a particular representative color. As previously discussed, the reduction of the set of colors to the set of representative colors may, in certain example embodiments, occur at operation 312 as part of generation of the first color value distribution representations.

At block 314, computer-executable instructions of the CVDR generation module(s) 232 may be executed to generate an aggregate representation of the distribution of color values across all child variant images. The aggregate color value distribution representation may be, for example, an average color histogram that indicates an average number of pixels across all child variant images that have color values corresponding to the color value of a particular representative color. If necessary, computer-executable instructions of the CVDR generation module(s) 232 may be executed to normalize each respective first color value distribution representation and/or the aggregate color value distribution representation to adjust for differences an image size (e.g., different numbers of pixels) among the set of child variant images.

At block 316, computer-executable instructions of the CVDR generation module(s) 232 may be executed to generate a respective second color value distribution representation for each child variant image using the respective first color value distribution representation and the aggregate color value distribution representation. For example, for each child variant image, computer-executable instructions of the CVDR generation module(s) 232 may be executed to subtract the corresponding first color histogram from the average color histogram to generate a second color histogram for the image. Alternatively, the average color histogram may be subtracted from each first color histogram to generate the corresponding second color histogram. In this manner, color values of pixels corresponding to static elements in an image may be excluded from consideration in the second color value distribution representations (e.g., the second color histograms).

Figure 4:
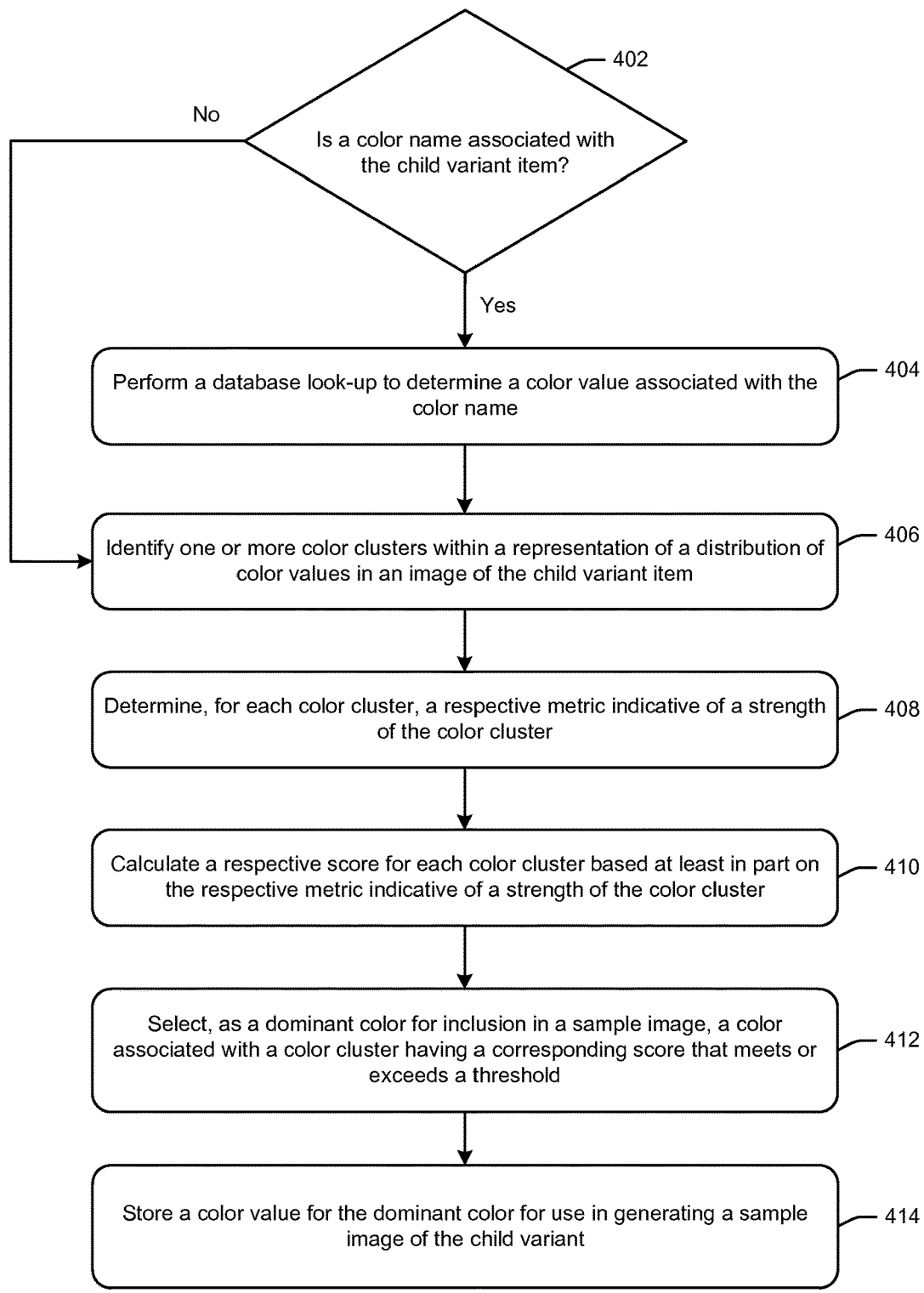
FIG. 4 is a process flow diagram of an illustrative method for selecting a set of one or more dominant colors for use in a sample image corresponding to a child variant of an item in accordance with one or more example embodiments of the disclosure.

FIG. 4 is a process flow diagram of an illustrative method 400 for selecting one or more dominant colors for use in a sample color image corresponding to a child variant of an item in accordance with one or more example embodiments of the disclosure. The method 400 may be performed using the second color value distribution representations generated from the method 300. While the method 400 will be described with reference to a particular child variant item, it should be appreciated that the method 400 may be performed to identify respective dominant color(s) present in each child variant of a parent item.

At block 402, computer-executable instructions of the sample image color selection module(s) 234 may be executed to determine whether a color name is associated with a particular child variant. In certain example embodiments, a color name may be assigned to a child variant by a manufacturer or distributor of the parent item to which the child variant relates. For example, a child variant of a clothing apparel item may be pre-associated with the color name "maroon." Further, in certain example embodiments, multiple color names may be associated with a particular child variant. For example, a child variant of a clothing apparel item may include a striped pattern of two alternating colors, in which case, a color name associated with each color may be associated with the child variant. The determination at block 402 may be made by accessing the child variant data 106A stored in the datastore(s) 104 to determine whether a pre-defined association exists between the child variant and character string(s) indicative of one or more color names.

In response to a positive determination at block 402, the method 400 may proceed to block 404 wherein computer-executable instructions of the sample image color selection module(s) 234 may be executed to perform a database look-up to identify a respective color value for each color name associated with the child variant. The color value may be a tuple in any suitable color space (e.g., a tuple in the CIELAB color space, a tuple in an RGB color space, etc.). In particular, in certain example embodiments, the child variant data 106A may be accessed to determine a color value of the color name identified at block 402 based on a stored mapping included in the child variant data 106A.

From block 404, the method 400 may proceed to block 406 where computer-executable instructions of the sample image color selection module(s) 234 may be executed to identify one or more color clusters present in the second color value distribution representation for the child variant image. Further, if it is determined at block 402 that no color name has been associated with the child variant, the database look-up operation at block 404 may be bypassed, and the method 400 may proceed to block 406. In addition, the child variant data 106A may not include a color value for the color name identified at block 402 in certain example embodiments, in which case, no color value may be obtained at block 404.

A color cluster may refer to a group of one or more representative colors in the second color value distribution that are separated from each other by a distance that does not exceed a threshold value. In certain example scenarios, the threshold value may be a JND distance between colors in the CIELAB color space. If the second color value distribution representation is a color histogram, the threshold value may correspond to a width of a color cluster. As previously noted, the threshold (e.g., the JND value) used to identify a color cluster may be larger than the threshold used to assign colors to color subgroups. As such, a color cluster may include representative colors from more than one color subgroup.

Once one or more color clusters have been identified, computer-executable instructions of the sample image color selection module(s) 234 may be executed at block 408 to determine a respective metric representative of a strength of each color cluster. The metric may be, for example, a number of pixels in the second color histogram that have color values corresponding to colors within the color cluster.

At block 410, computer-executable instructions of the scoring module(s) 236 may be executed to calculate a respective score for each color cluster using the strength metric. In those example embodiments in which a color name has been associated with the child variant, the score of a color cluster may be calculated by dividing the strength metric for the color cluster by a distance of the color cluster from the color value associated with the color name. In certain example embodiments, the color value of a particular representative color in the color cluster may be chosen for determining the distance of the color cluster from the color value associated with the color name. In other example embodiments, an average color value for the color cluster may be chosen for calculating the distance. If multiple color names have been associated with a child variant (e.g., a clothing apparel item having a striped pattern of alternating colors), a score for the color cluster may be calculated with respect to each color name. Further, in those example embodiments in which no color name is pre-associated with the child variant, all color distances may be normalized to 1, in which case, the strength metric itself may represent the score of a color cluster.

At block 412, computer-executable instructions of the sample image color selection module(s) 234 may be executed to compare the respective score calculated for each identified color cluster against a corresponding threshold value to determine whether to select a color from the color cluster as a dominant color for use in a sample image of the child variant. If the score calculated for a color cluster meets or exceeds the threshold value, a color from the color cluster may be identified as a dominant color. In certain example embodiments, multiple color clusters may satisfy the threshold value, in which case, multiple dominant colors may be selected for use in the sample color image. In those example embodiments in which no color cluster satisfies the threshold value, a color in the color cluster having the highest score may be selected as the dominant color. Once one or more dominant colors have been identified for the child variant, one or more color values for the dominant color(s) may be stored at block 414 for subsequent use in generating a sample image of the child variant.

One or more operations of the methods 300 or 400 may have been described above as being performed by a sample color selection server 202, or more specifically, by one or more program modules, applications, or the like executing on the sample color selection server 202. It should be appreciated, however, that any of the operations of methods 300 or 400 may be performed, at least in part, in a distributed manner by one or more other devices (e.g., the website publisher server 204, the user device 206, etc.), or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 300 or 400 may be described in the context of the sample color selection server 202, it should be appreciated that such operations may be implemented in connection with numerous other device configurations.

The operations described and depicted in the illustrative methods of FIGS. 3 and 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3 and 4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
    identifying a set of child variant images, each child variant image comprising an image of a respective child variant of a parent retail item;
    determining a set of colors in the set of child variant images;
    assigning, by a computer processor, each color in the set of colors to a respective color subgroup;
    reducing, by the computer processor, the set of colors present in the set of child variant images to a smaller set of representative colors, wherein each respective color subgroup corresponds to a respective representative color in the set of representative colors;
    generating, by the computer processor, a first color histogram for a particular child variant image indicative of one or more representative colors present in the particular child variant image;
    generating, by the computer processor, an average color histogram for the set of child variant images;
    modifying, by the computer processor, the first color histogram using the average color histogram to generate a second color histogram for the particular child variant image;
    identifying, by the computer processor, a color cluster present in the second color histogram;
    determining, by the computer processor, a score for the color cluster indicative of a number of pixels in the particular child variant image having color values corresponding to the color cluster;
    determining, by the computer processor, that the score meets or exceeds a threshold value;
    selecting, by the computer processor, a particular color from the color cluster as a dominant color for inclusion in a sample image corresponding to the particular child variant;
    storing, by the computer processor, a color value corresponding to the particular color;
    modifying webpage source content to cause the sample image to be generated using the color value; and
    generating the sample image responsive to a request for webpage content, wherein the sample image represents the dominant color of the particular child variant of the parent retail item.

2. The method of claim 1, wherein assigning each color in the set of colors to a respective color subgroup comprises:
    determining that a color distance between a first color value associated with a first color in a color space and a second color value associated with a second color in the color space is within a threshold color distance; and
    assigning the first color and the second color to a same color subgroup.

3. The method of claim 2, wherein the color distance is a first color distance and the threshold color distance is a first threshold color distance, and wherein identifying a color cluster present in the second color histogram comprises:
    determining that a second color distance between a third color value associated with a first representative color in the color space and a fourth color value associated with a second representative color in the color space is within a second threshold color distance; and
    determining that the first representative color and the second representative color are included in the color cluster,
    wherein the first threshold color distance is less than the second threshold color distance.

4. The method of claim 1, wherein determining a score for the color cluster comprises:
    generating the score by dividing the number of pixels by a color distance between a color value associated with the color cluster and a color value of a color name associated with the particular child variant.

5. The method of claim 1, wherein modifying the first color histogram using the average color histogram comprises subtracting the average color histogram from the first color histogram to generate the second color histogram or subtracting the first color histogram from the average color histogram to generate the second color histogram.

6. A method, comprising:
    identifying a set of images comprising a particular image of a particular child variant of a parent item;
    determining a set of colors in the set of images;
    assigning, by a computer processor, a first color and a second color in the set of colors to a color subgroup;
    determining, by the computer processor, a representative color for the color subgroup;
    generating, by the computer processor, a first color value distribution representation for the particular image, wherein the first color value distribution representation associates each pixel in the particular image having a color value corresponding to the first color or the second color with a color value of the representative color;
    generating, by the computer processor, an aggregate color value distribution representation for the set of images;
    modifying, by the computer processor, the first color value distribution representation based at least in part on the aggregate color value distribution representation to generate a second color value distribution representation for the particular image;
    selecting, by the computer processor and based at least in part on the second color value distribution representation, the representative color as a dominant color for inclusion in a sample image corresponding to the particular child variant;
    modifying webpage source content to cause the sample image to be generated using the dominant color; and
    generating, responsive to a request for webpage content, the sample image comprising the dominant color, wherein the sample image represents the dominant color of the particular child variant of the parent item.

7. The method of claim 6, further comprising:
    identifying, by the computer processor, a color cluster present in the second color value distribution representation;
    determining, by the computer processor, a score for the color cluster;
    determining, by the computer processor, whether the score meets or exceeds a threshold value; and
    selecting, by the computer processor, the representative color as the dominant color based at least in part on whether the score meets or exceeds the threshold value.

8. The method of claim 6, wherein assigning the first color and the second color to the color subgroup comprises determining that a color distance between a first color value of the first color and a second color value of the second color is within a threshold color distance.

9. The method of claim 6, wherein assigning the first color to the color subgroup comprises:
determining that a distance between a color value of the first color and a respective color value corresponding to each of one or more other colors in the set of colors that have been assigned to an existing color subgroup exceeds a threshold color distance; and
assigning the first color to a new color subgroup, wherein the new color subgroup is the color subgroup.

10. The method of claim 6, wherein determining a representative color for the color subgroup comprises reducing the set of colors to a smaller set of representative colors by performing bit-depth compression of the set of colors.

11. The method of claim 6, wherein a color value corresponding to the representative color is a statistical quantity generated from a respective color value corresponding to each color in the color subgroup.

12. The method of claim 6, wherein the first color value distribution representation comprises a first color histogram, the second color value distribution representation comprises a second color histogram, and the aggregate color value distribution representation comprises an average color histogram for the set of images, and wherein modifying the first color histogram comprises one of: i) subtracting, for each representative color, a respective number of pixels for the representative color in the first color histogram from a respective number of pixels for the representative color in the average color histogram or ii) subtracting, for each representative color, a respective number of pixels for the representative color in the average color histogram from a respective number of pixels for the representative color in the first color histogram.

13. The method of claim 12, wherein the representative color is a first representative color, wherein a second representative color corresponds to a static element in the set of images, and wherein a number of pixels corresponding to the second representative color in the second color histogram is less than a number of pixels corresponding to the second representative color in the first color histogram.

14. The method of claim 6, wherein the representative color is a first representative color and the color value of the first representative color is a first color value, and wherein identifying the color cluster comprises:
determining that the first color value is within a threshold color distance from a second color value of a second representative color in the second color value distribution representation; and
determining that the color cluster comprises the first representative color and the second representative color.

15. The method of claim 14, wherein determining the score for the color cluster comprises:
determining a strength metric for the color cluster based at least in part on a total number of pixels having color values that correspond to one or more colors in the color cluster; and
dividing the strength metric by a color distance between the color cluster and a color value of a color name associated with the particular child variant.

16. The method of claim 15, wherein the color distance between the color cluster and the color value of the color name comprises one of: i) a color distance between the color value of the color name and one of the first color value, the second color value, or a third color value of a third representative color in the color cluster or ii) a color distance between an average color value of the color cluster and the color value of the color name.

17. The method of claim 6, further comprising:
storing, by the computer processor, a color value of the representative color; and
directing, by the computer processor, transmission of the color value of the representative color for generating a sample image of the particular child variant.

18. A system, comprising:
at least one memory storing computer-executable instructions; and
at least one processor configured to access the at least one memory and execute the computer-executable instructions to:
identify a set of images, wherein each image corresponds to a respective child variant of a parent item;
generate a first color value distribution representation corresponding to a particular image in the set of images, wherein the particular image corresponds to a particular child variant;
generate an aggregate color value distribution representation for the set of images;
generate a second color value distribution representation by modifying the first color value distribution representation based at least in part on the aggregate color value distribution representation;
identify a color cluster present in the second color value distribution representation;
determine a score for the color cluster;
determine whether the score meets or exceeds a threshold value;
select a particular color from the color cluster for inclusion in a sample image corresponding to the particular child variant based at least in part on whether the score meets or exceeds the threshold value;
modify webpage source content to cause the sample image to be generated using the particular color; and
generate, responsive to a request for webpage content, the sample image comprising the particular color, wherein the sample image represents the particular color of the particular child variant of the parent item.

19. The system of claim 18, wherein the at least one processor is further configured to execute the computer-executable instructions to:
determine a set of colors in the set of images;
assign a first subset of the set of colors to a first color subgroup and a second subset of the set of colors to a second color subgroup; and
determine a first representative color for the first color subgroup and a second representative color for the second color subgroup, wherein each color in the first subset is represented by a first color value corresponding to the first representative color and each color in the second subset is represented by a second color value corresponding to the second representative color.

20. The system of claim 18, wherein the color cluster is a first color cluster and the score is a first score, wherein it is determined that the first score meets or exceeds the threshold value, wherein the particular color selected from the first color cluster is a first color, and wherein the at least one processor is further configured to execute the computer-executable instructions to:
identify a second color cluster in the second color value distribution representation;

determine a second score for the second color cluster;
determine that the second score meets or exceeds the threshold value; and
select a second color from the second color cluster for inclusion in the sample image.

* * * * *